May 22, 1951  E. GOVONI  2,554,024
GAUGE WIRE HOLDER
Filed May 3, 1948
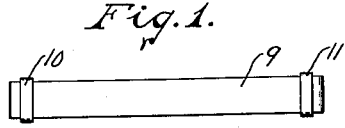
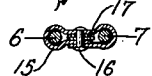
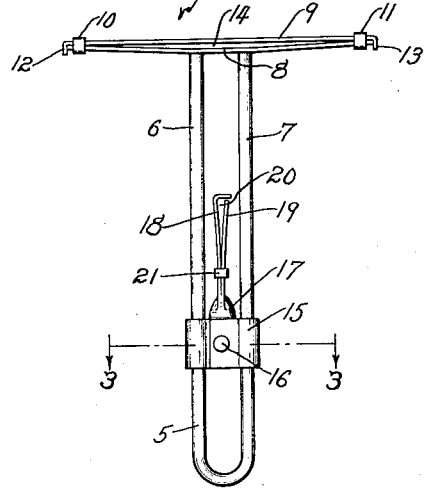
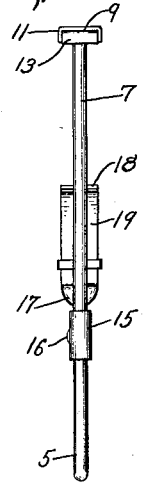
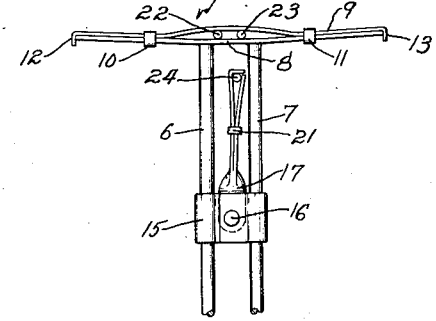
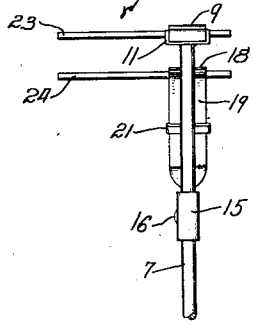
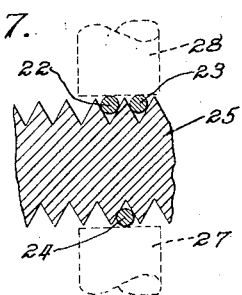
INVENTOR.
ENRICO GOVONI
BY
Louis V. Lucia
ATTORNEY Patented May 22, 1951

2,554,024

UNITED STATES PATENT OFFICE 2,554,024

GAUGE WIRE HOLDER

Enrico Govoni, Elmwood, Conn.

Application May 3, 1948, Serial No. 24,849

5 Claims. (Cl. 33—169)

This invention relates to gage wire holders and more particularly to such devices as are adapted to securely hold gage wires which are to be used for measuring the pitch diameters of externally screw threaded members.

An object of the invention is to provide a gage wire holder which is easy to handle, simple to operate and extremely light in weight.

A further object of the invention is to provide a gage wire holder so constructed as to accommodate gage wires of different sizes such as used for measuring different diameter screw threads.

A still further object of this invention is to provide a gage wire holder which is very simply constructed and inexpensive to manufacture.

Further objects and advantages of this invention will be more clearly understood from the following description and from the accompanying drawings in which:

Fig. 1 is a plan view of my novel gage wire holder.

Fig. 2 is an elevational front view thereof.

Fig. 3 is a sectional view on line 3—3 of Fig. 2 illustrating the construction of my gage wire holder.

Fig. 4 is an elevational side view thereof.

Fig. 5 is a fragmentary elevational front view of a wire holder embodying my invention illustrating the manner in which the gage wires are held thereby.

Fig. 6 is an elevational side view thereof.

Fig. 7 is an enlarged sectional view illustrating the manner in which the gage wires carried by my wire holder are used for measuring the pitch diameter of a screw.

Fig. 8 is a plan view of my novel wire holder illustrating the positions assumed by the gage wires when a measurement is being taken.

In the embodiment of my invention as shown in the drawings, the numeral 5 indicates a U-shaped handle member constructed of wire or other suitable material and having fastened to the legs 6 and 7 thereof a flat horizontal supporting bar 8, the opposite end portions of which diverge slightly upwardly as shown in Fig. 2. A flat resilient retaining strip 9 formed from spring steel, or the like, is supported on the extremities of the said member 8 and retained thereon by means of straps 10 and 11 which are slidable over the said members 8 and 9. Endwise movement of the retaining member 9 is prevented by ears 12 and 13 which preferably extend downwardly therefrom and abut the ends of the supporting member 8. It will be noted that, by providing the upwardly diverging arms on the bar 8, a space 14 is formed between it and the resilient retaining member 9 which facilitates the insertion of the gage wires between the said members.

A slide 15, preferably of sheet metal or the like, is formed to provide elongated openings therethrough to receive the legs 6 and 7 of the handle 5 as shown in Fig. 3; the said bracket being preferably secured together by a rivet 16 by means of which there is pivotally mounted on the said bracket and between the sides thereof a wire supporting tab 17 which has fingers 18 and 19 extending therefrom. The top of the said finger 18 is bent at a right angle thereto and projects over the finger 19 to form an opening 20 therebetween for the reception of a gage wire. The said wire is securely retained between the fingers by sliding a strap 21 upwardly thereover to urge the fingers together and against the said wire.

In the use of my improved wire holder for measuring the pitch diameter of externally screw threaded members, the correct size of gage wire for the thread to be measured is first determined by means of a formula such as is commonly known by those skilled in the art. Two gage wires 22 and 23 of the correct size are inserted into the space 14 between the members 8 and 9 and retained therebetween by sliding the straps 10 and 11 inwardly over the said member thus drawing the resilient retaining member 9 against the said wires 22 and 23 and resiliently clamping them therebetween.

It will be noted, however, that the wires may be moved while held in the clamping member in order that they may be adjusted to the helix angle of the screw.

A third wire 24 is placed between the fingers 18 and 19 and retained therebetween by sliding the strap 21 upwardly on the said fingers. The three wires are positioned in my improved holder to extend outwardly therefrom as illustrated in Fig. 6. The externally threaded member 25, to be measured, is then placed under the wires 22 and 23 and the wires positioned in adjacent thread grooves at one side of the member 25 and in line with the threads. The slide 15 is then moved upwardly on the legs of the handle 5 until the wire 24 is positioned in the intermediate thread at the opposite side of the threaded member and in line therewith, so that the said wires are located as illustrated in Figs. 7 and 8 and there is provided two gage points at one side of the screw and one co-acting gage point at the other side thereof.

It will be noted that, by adjustably clamping the wires 22 and 23 between the members 8 and 9, the helix angle of the thread is accounted for when the wires are resting within the thread grooves. Also, any relative off-center position or slight discrepancy in angularity of the third wire 24 will be readily taken up by reason of its being secured between the fingers 18 and 19 which are pivotally mounted on the loose fitting bracket 15.

When the wires have been correctly positioned between the respective threads, a conventional micrometer, having an anvil 27 and a movable spindle 28, may be placed over the said wires and a measurement taken from which, by suitable calculations, the pitch diameter of the screw may be determined.

From the above description, it will be understood that I have provided a gage wire holder by means of which three measuring wires will be securely held in such a manner that they may be readily adjusted into position for measuring threads and then held in such position with one hand of the user while the other hand is left free to manipulate the measuring micrometer.

While I have illustrated and described a preferred form of construction for carrying my invention into effect, it is to be understood that the same is capable of variations without departing from the true spirit of the invention.

I claim:

1. A holder of the character described, for gage wires, comprising means for adjustably supporting a pair of wires in spaced relation, a slide member slidably mounted relatively to said supporting means, and a pair of fingers pivotally mounted to said slide member for adjustably supporting a third wire relatively to said pair of wires to permit measurements of thread diameters.

2. A holder of the character described for gage wires, said holder comprising a supporting bar, resilient means on said supporting bar for adjustably securing thereon a pair of spaced wires, parallel bars extending from said supporting bar, a slide member slidable on said parallel bars, and supporting means for a third wire pivotally carried on said slide member for adjustably positioning said third wire relatively to the pair of wires, the said slide member being loosely slidable on said parallel bars.

3. A gage wire holder comprising a substantially U-shaped handle, a flat elongated wire supporting bar attached to the ends of the legs of the said handle and perpendicular to the axis thereof, the end portions of said supporting bar diverging from the intermediate portion thereof in a direction away from said handle, a normally flat resilient retaining member positioned adjacent the said supporting bar and supported by the end portions thereof, a pair of straps circumventing the said members and slidable thereover for securing a plurality of gage wires between the supporting member and the retaining member, and means slidable on the legs of the said U-shaped handle and having fingers for holding a co-acting gage wire and permitting adjustment of said gage wire relatively to the wires held between the supporting member and the retaining member.

4. A gage wire holder of the character described comprising a substantially U-shaped handle, a flat rectangularly cross-sectional wire supporting bar fastened across the ends of the legs of said U-shaped handle and perpendicularly thereto, the span across the ends of the said legs being flat and the end portions of said supporting bar diverging upwardly from a point outside the said legs, a normally flat resilient retaining member carried by the said end portions of the supporting bar, a pair of straps slidable over the said retaining member and supporting bar for securing the said resilient member to the supporting bar, ears extending from said resilient member and abutting the ends of the supporting bar for preventing endwise movement of the resilient member relatively to the said bar, a bracket circumventing the legs of said handle and freely slidable thereon, a member pivotally mounted in said bracket and disposed between the legs of said handle, a pair of flat fingers extending vertically from said member, the said fingers being normally urged apart, and a strap around the said fingers and slidable thereover for urging the said fingers together to hold a gage wire therebetween which co-acts with a pair of gage wires held between the said supporting bar and the said retaining member for measuring the pitch diameter of a screw thread.

5. A holder for gage wire comprising a handle, a flat supporting bar attached to the end of said handle and perpendicular to the axis of the handle, a resilient retaining member positioned upon said supporting bar and supported thereby, straps embracing the said retaining member and the said supporting bar and being slidable thereon to secure a pair of wires therebetween, a separate member slidable on the said handle, and supporting means pivotally mounted on said separate member for adjustably supporting a third wire relatively to the said pair of wires to permit measurement of a threaded member therebetween.

ENRICO GOVONI.

REFERENCES CITED

The following references are of record in the file of this patent:

FOREIGN PATENTS

| Number | Country | Date |
|---|---|---|
| 107,855 | Great Britain | July 19, 1917 |
| 116,484 | Australia | July 8, 1941 |
| 555,830 | Great Britain | Sept. 9, 1943 |

OTHER REFERENCES

Publ. Popular Science, page 172, Apr. 1944.